(12) United States Patent
Kawasumi

(10) Patent No.: US 10,768,518 B2
(45) Date of Patent: Sep. 8, 2020

(54) LIGHT SOURCE APPARATUS AND IMAGE PROJECTION APPARATUS HAVING THE SAME

(71) Applicant: CANON KABUSHIKI KAISHA, Tokyo (JP)

(72) Inventor: Takehito Kawasumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/575,737

(22) Filed: Sep. 19, 2019

(65) Prior Publication Data

US 2020/0103737 A1     Apr. 2, 2020

(30) Foreign Application Priority Data

Sep. 27, 2018 (JP) .................................. 2018-181305

(51) Int. Cl.
| | | |
|---|---|---|
| G03B 21/20 | (2006.01) | |
| G02B 27/10 | (2006.01) | |
| G02B 27/14 | (2006.01) | |
| G03B 21/00 | (2006.01) | |

(52) U.S. Cl.
CPC ......... *G03B 21/204* (2013.01); *G02B 27/102* (2013.01); *G02B 27/14* (2013.01); *G03B 21/208* (2013.01); *G03B 21/006* (2013.01)

(58) Field of Classification Search
CPC .. G03B 21/204; G03B 21/208; G03B 21/006; G02B 27/14; G02B 27/102
See application file for complete search history.

(56) References Cited

U.S. PATENT DOCUMENTS

| | | | |
|---|---|---|---|
| 8,915,597 B2 | 12/2014 | Kitano | |
| 9,869,867 B2 | 1/2018 | Tajiri | |
| 2012/0099082 A1* | 4/2012 | Wang | G03B 21/2066 353/31 |
| 2014/0028981 A1* | 1/2014 | Matsubara | G03B 21/2073 353/20 |
| 2016/0088273 A1* | 3/2016 | Fukui | H04N 9/3164 353/31 |
| 2016/0373705 A1* | 12/2016 | Hashizume | H04N 9/3158 |

(Continued)

FOREIGN PATENT DOCUMENTS

| | | |
|---|---|---|
| JP | 2014081644 A | 5/2014 |
| JP | 5928383 B2 | 6/2016 |
| JP | 5979416 B2 | 8/2016 |

*Primary Examiner* — Donald L Raleigh
(74) *Attorney, Agent, or Firm* — Rossi, Kimms & McDowell LLP

(57) ABSTRACT

A light source apparatus includes a first light source configured to generate first light, a phosphor to be excited by the first light to generate second light, a second light source configured to generate third light, and a spectroscopic optical element configured to reflect the first light to the phosphor and to combine the first light reflected without being absorbed by the phosphor, the second light, and the third light with one another. The spectroscopic optical element has a first area and a second area. The first area has a spectral characteristic of reflecting the first light, of transmitting the second light, and of reflecting the third light. The second area has a spectral characteristic of transmitting the first light and the second light, and of reflecting the third light.

16 Claims, 6 Drawing Sheets

(56) References Cited

U.S. PATENT DOCUMENTS

| | | | | |
|---|---|---|---|---|
| 2017/0208308 A1* | 7/2017 | Iguchi | ............... | G02B 5/0284 |
| 2018/0052386 A1* | 2/2018 | Hashizume | .......... | G03B 21/204 |
| 2018/0259834 A1* | 9/2018 | Endo | .................. | G03B 21/204 |
| 2019/0391473 A1* | 12/2019 | Uchiyama | ............ | H04N 9/3161 |
| 2019/0391476 A1* | 12/2019 | Akiyama | ............. | H04N 9/3158 |
| 2020/0033707 A1* | 1/2020 | Sakata | ............... | G03B 21/2013 |

\* cited by examiner

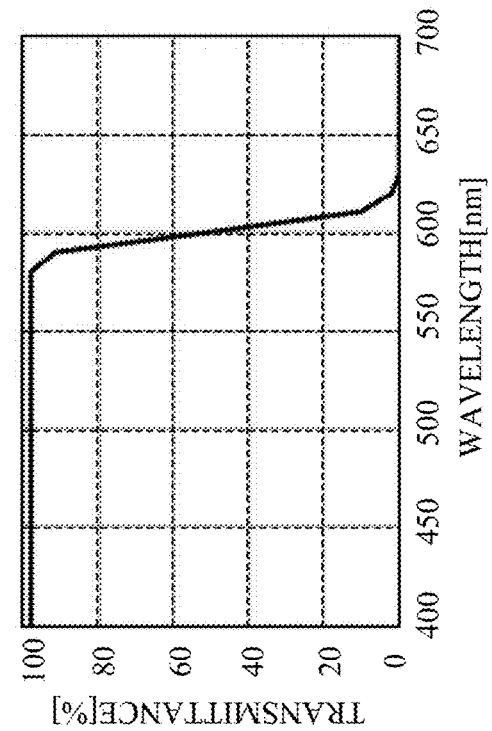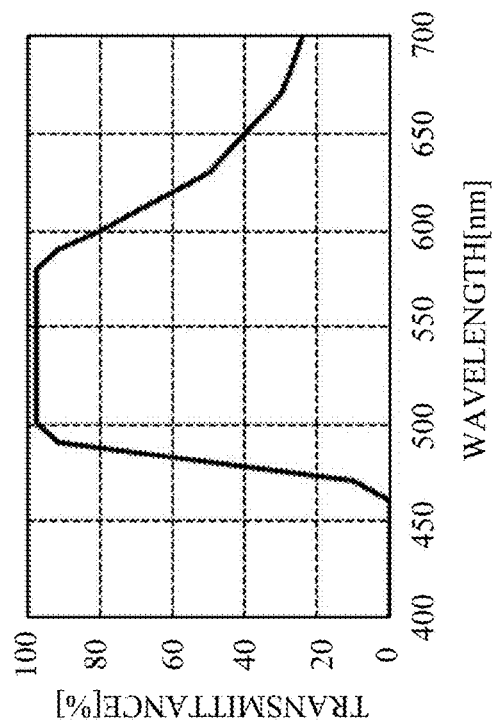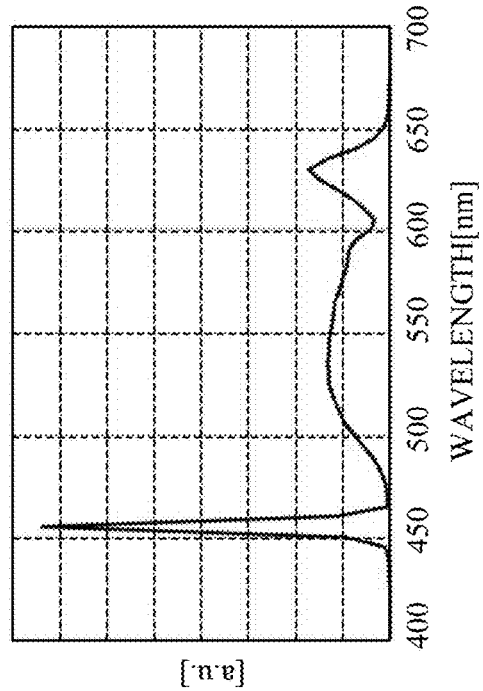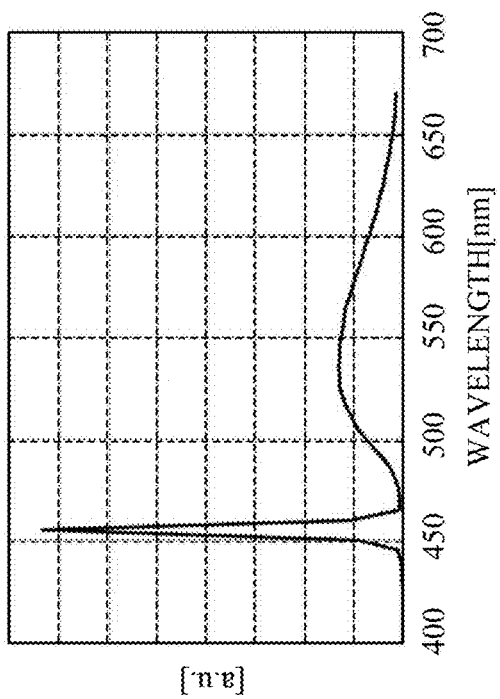
FIG. 3A
FIG. 3B
FIG. 4
FIG. 5

LIGHT SOURCE APPARATUS AND IMAGE PROJECTION APPARATUS HAVING THE SAME

BACKGROUND OF THE INVENTION

Field of the Invention

The present invention relates to a light source apparatus and an image projection apparatus having the same.

Description of the Related Art

Image projection apparatuses (projectors) have recently been developed that irradiate a phosphor with a light beam emitted from a high-power laser diode as excitation light and use fluorescent light having a converted wavelength. Japanese Patent Laid-Open No. 2014-081644 discloses a three-element type projector that uses a phosphor in which a single phosphor is continuously formed along a circumferential direction of a disc. Japanese Patents Nos. 5928383 and 5979416 disclose a projector that includes an excitation light source that generates blue light, a red light source that generates red light, and a phosphor, and combines fluorescent light and red light with each other.

The projector disclosed in Japanese Patent No. 5928383 utilizes the polarization dependency of the spectral characteristic of the dichroic mirror relative to the blue light component. However, the P-polarized light component of the unconverted blue light reflected on the phosphor passes through the dichroic mirror and returns to the blue light source, and thus the light utilization efficiency lowers and the blue light amount is insufficient. Since the desired polarization dependency is given to the dichroic mirror, it is difficult to manufacture a dielectric multilayer film. In addition, the projector becomes large because it is necessary to dispose the dichroic mirror on an optical path of a light beam obtained by combining the fluorescent light with the red light, and to combine the blue light through the dichroic mirror.

In the projector disclosed in Japanese Patent No. 5979416, the dichroic mirror has a polarization dependency of a blue light component, similar to Japanese Patent No. 5928383, but the number of necessary components increases, such as a retardation plate. Similar to the configuration of Japanese Patent No. 5928383, it is necessary to provide the desired polarization dependency to the dichroic mirror. It is thus difficult for the projector having the excitation light source, the phosphor, and the red light source in order to compromise both the brightness and the white balance, to maintain a blue light component for forming white light and to consequently achieve excellent color reproducibility. Moreover, it is demanded to achieve good color reproducibility with a compact and simple configuration.

SUMMARY OF THE INVENTION

The present invention provides a light source apparatus and an image projection apparatus, each of which has a compact and simple configuration and excellent color reproducibility.

A light source apparatus according to one aspect of the present invention includes a first light source configured to generate first light, a phosphor to be excited by the first light to generate second light, a second light source configured to generate third light, and a spectroscopic optical element configured to reflect the first light to the phosphor and to combine the first light reflected without being absorbed by the phosphor, the second light, and the third light with one another. The spectroscopic optical element has a first area and a second area. The first area has a spectral characteristic of reflecting the first light, of transmitting the second light, and of reflecting the third light. The second area has a spectral characteristic of transmitting the first light and the second light, and of reflecting the third light.

A light source apparatus according to another aspect of the present invention includes a first light source configured to generate first light, a phosphor to be excited by the first light to generate second light, a second light source configured to generate third light, and a spectroscopic optical element configured to reflect the first light to the phosphor and to combine the first light reflected without being absorbed by the phosphor, the second light, and the third light with one another. The spectroscopic optical element has a first area and a second area. The first area has a spectral characteristic of transmitting the first light, of reflecting the second light, and of transmitting the third light. The second area has a spectral characteristic of reflecting the first light, of reflecting the second light, and of transmitting the third light.

An image projection apparatus including the above light source apparatus, a light modulator, and an illuminating optical system configured to illuminate the light modulation element with a light beam emitted from the light source apparatus constitute another aspect of the present invention.

Further features of the present invention will become apparent from the following description of exemplary embodiments with reference to the attached drawings.

BRIEF DESCRIPTION OF THE DRAWINGS

FIGS. 3A and 3B are spectral characteristic diagrams of the spectroscopic optical element according to the first embodiment.

FIG. 4 is a spectral distribution diagram of light reflected on a phosphor according to the first embodiment.

FIG. 5 is a spectral distribution diagram of white light emitted from the light source apparatus according to the first embodiment.

DESCRIPTION OF THE EMBODIMENTS

Referring now to the accompanying drawings, a description will be given of embodiments according to the present invention.

First Embodiment

Figure 1:
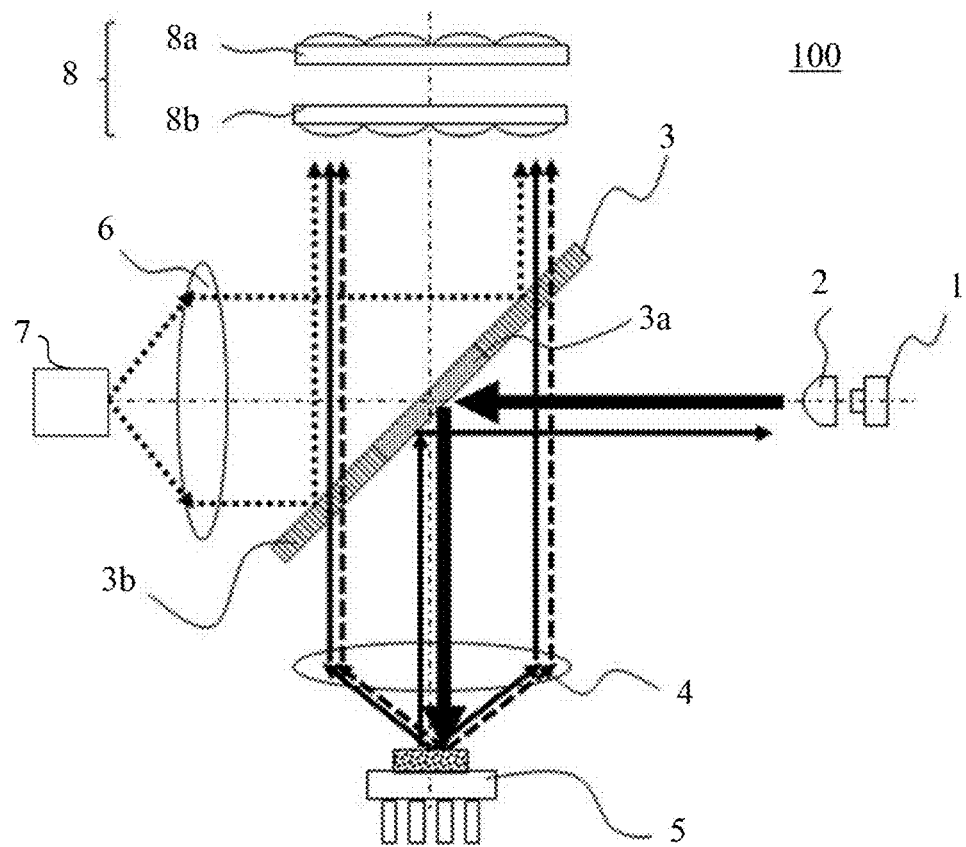
FIG. 1 is a configuration diagram of a light source apparatus according to the first embodiment.

Referring now to FIG. 1, a description will be given of a light source apparatus according to a first embodiment of the present invention. FIG. 1 is a configuration diagram of a light source apparatus 100. The light source apparatus 100 includes a first light source (excitation light source) 1, a collimator lens 2, a spectroscopic optical element (optical path combining element) 3, a condenser lens 4, a phosphor (fluorescent body) 5, a condenser lens 6, and a second light source (red light source) 7, and a fly-eye lens 8. The fly-eye lens 8 has a first fly-eye lens 8a and a second fly-eye lens 8b. Hereinafter, each component will be described in detail in order from the first light source 1.

The first light source 1 is a blue laser diode (blue excitation light source) that generates light having a wavelength of 455 nm. The light beam emitted from the first light source 1 is a divergent light beam, which is converted into a parallel light beam by the collimator lens 2 disposed just after it, and then travels toward the spectroscopic optical element 3. The first light source 1 and the second light source 7 are located opposite to each other with respect to the spectroscopic optical element 3.

Figure 2A:
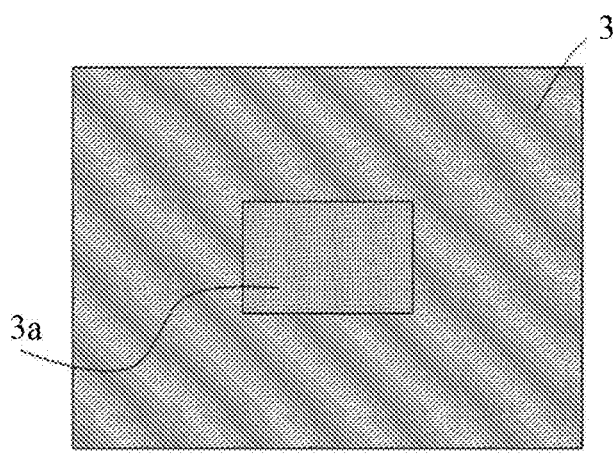
FIGS. 2A and 2B are configuration diagrams of a spectroscopic optical element according to the first embodiment.
Figure 2B:
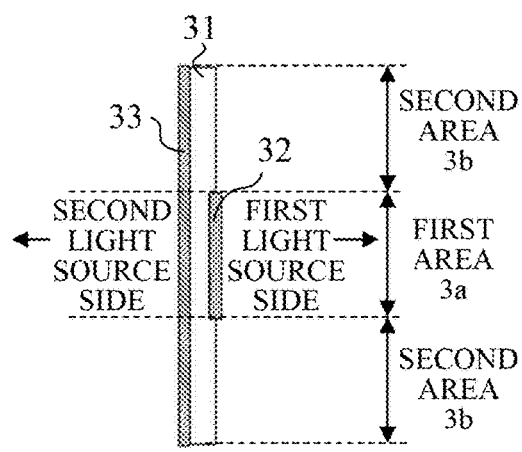

Referring now to FIGS. 2A and 2B, a description will be given of a configuration of the spectroscopic optical element 3. FIGS. 2A and 2B are configuration diagrams of the spectroscopic optical element 3. FIG. 2A is its front view, and FIG. 2B is its side view. As illustrated in FIG. 2B, the spectroscopic optical element 3 includes a light-transmissive flat plate 31, a first color separation film 32 formed on a surface on the first light source side of the light-transmissive flat plate 31, and a second color separation film 33 formed on a surface on the second light source side of the light-transmissive flat plate 31. The first color separation film 32 and the second color separation film 33 are dielectric multilayer films having different spectral characteristics (transmittance characteristics, reflectance characteristics).

As illustrated in FIG. 2A, the spectroscopic optical element 3 has a first area (first partial region) 3a and a second area (second partial region) 3b. When viewed from the front, the first area 3a corresponds to an area where the first color separation film 32 is formed or the first color separation film 32 and the second color separation film 33 overlap each other. When viewed from the front, the second area 3b corresponds to an area where only the second color separation film 33 is formed (an area where the first color separation film 32 is not formed) or an area where the color separation film 32 and the second color separation film 33 do not overlap each other. As illustrated in FIG. 2A, the first area 3a is provided at the center of the spectroscopic optical element 3, and the second area 3b surrounds the first area 3a at the outer circumference of the spectroscopic optical element 3. The first area 3a and the second area 3b are each rectangular (square), but the present invention is not limited to this embodiment and is applicable to other shapes, such as a rectangular shape and a circular shape, as long as the second area 3b may surround the first area 3a.

The first area 3a and the second area 3b have different spectral characteristics (transmittance characteristics, reflectance characteristics) when light enters them. The first area 3a is formed only in part of a narrow range with an area ratio of about 10 to 20% of the entire spectroscopic optical element 3. Since the light emitted from the first light source 1 has a high directivity and a small light beam diameter, the light enters only the first area 3a in the spectroscopic optical element 3.

As described above, the dielectric multilayer films deposited on the surface on the side where the first light source 1 is disposed and the surface on the side where the second light source 7 opposite to the surface is disposed have different ranges and spectral characteristics. When the first color separation film (dielectric multilayer film) 32 provided on the surface on the first light source 1 side is formed only in the area corresponding to the first area 3a when the spectroscopic optical element 3 is viewed from the front (in the front view of FIG. 2A). An antireflection film is formed in another area on the surface on the first light source 1 side. On the other hand, the second color separation film (dielectric multilayer film) 33 formed on the side where the second light source 7 is disposed is formed over the entire optical effective range.

Referring now to FIGS. 3A and 3B, a description will be given of the spectral characteristic (spectral transmittance) of the dielectric multilayer film (the first color separation film 32 and the second color separation film 33). FIGS. 3A and 3B show the spectral transmittance of the dielectric multilayer film, FIG. 3A shows the spectral transmittance of the first color separation film 32, and FIG. 3B shows the spectral transmittance of the second color separation film 33. In each of FIGS. 3A and 3B, the abscissa axis represents a wavelength (nm) of light, and the ordinate axis represents a transmittance (%).

As shown in FIGS. 3A and 3B, the first color separation film 32 has a characteristic of reflecting light having a blue band wavelength in the range of 440 to 480 nm. Thus, the blue light from the first light source 1 incident on the spectroscopic optical element 3 is reflected and travels toward the phosphor 5. On the other hand, the first color separation film 32 has a characteristic of transmitting light having a green band wavelength in the range of 490 nm to 590 nm. A characteristic of the first color separation film 32 is not specifically limited for light having a red band wavelength in the range of 600 nm to 700 nm. In general, manufacturing the dielectric multilayer film becomes more difficult as the wavelength band that limits the spectral characteristic becomes broader. The manufacturing difficulty is relaxed without limiting the red band of the first color separation film 32 in FIG. 3A, while only the blue band and the green band are limited.

The second color separation film 33 illustrated in FIG. 3B has a characteristic of transmitting the light with a blue band wavelength in the range of 440 to 480 nm and the light with a green band wavelength in the range of 490 nm to 590 nm. The second color separation film 33 has a characteristic of reflecting the light with a red band wavelength in the range of 600 nm to 700 nm. Accordingly, when the red light enters the first area 3a, the spectroscopic optical element 3 includes the first color separation film 32 having the characteristics illustrated in FIG. 3A and the second color separation film 33 having the characteristics illustrated in FIG. 3B. Since it has a multiplication characteristic, it has a characteristic of reflecting the entire red band light.

That is, this embodiment forms the dielectric multilayer film (first color separation film 32 and second color separation film 33) having different areas and characteristics on one surface and the other surface of the spectroscopic optical element 3, respectively. Thereby, the first area 3a has a spectral characteristic of reflecting the first light (blue light), of transmitting the second light (green light), and of reflecting the third light (red light). On the other hand, the second area 3b has a spectral characteristic of transmitting the first light (blue light) and the second light (green light), and of reflecting the third light (red light).

The blue light that has entered and been reflected on particularly the first area 3a of the spectroscopic optical element 3 toward the phosphor 5 is condensed on the phosphor 5 via the condenser lens 4. The blue light incident on the phosphor 5 is absorbed, converted into fluorescent light having a wide spectral distribution in the range of 480 to 650 nm, and reflected.

Referring now to FIG. 4, a description will be given of the spectral distributions of the fluorescent light reflected by the phosphor 5 and the unconverted blue light. FIG. 4 is a spectral distribution diagram of the fluorescent light reflected from the phosphor 5. In FIG. 4, the abscissa axis represents a wavelength (nm) and the ordinate axis represents arbitrary units (a. u.).

The phosphor 5 uses a phosphor configured to emit intense green light having an emission peak particularly near 530 nm, and having many wavelength components with high relative luminosities, and possesses a high light emission efficiency. Hence, the brightness of the light source apparatus 100 can be made higher. Part of the excitation light is reflected as the unconverted blue light while the wavelength of the first light source 1 is maintained to be 455 nm.

The fluorescent light component reflected by the phosphor 5 is condensed and collimated by the condenser lens 4, and travels toward the spectroscopic optical element 3 again. At this time, since fluorescent light is generated isotopically in all directions, the light beam diameter when the light is collimated by the condenser lens 4 is larger than that of the blue light when the blue light enters the phosphor 5. Thus, when the blue light enters the spectroscopic optical element 3 from the first light source 1, the blue light enters only the first area 3a but the fluorescent light generated from the phosphor 5 enters both the first area 3a and the second area 3b.

FIGS. 3A and 3B show that both the first area 3a and the second area 3b have spectral characteristics that transmit the green light component having a wavelength of 490 to 590 nm. Hence, among the fluorescent light generated from the phosphor 5, the green light having a wavelength of 490 to 590 nm transmits the spectroscopic optical element 3 and enters the subsequent illumination optical system. On the other hand, light having a wavelength higher than 590 nm among the fluorescent light is reflected by the spectroscopic optical element 3 to the first light source 1 side and cannot be obtained.

A detailed description will now be given of a behavior of the blue light component reflected from the phosphor 5 without being converted. The phosphor 5 contains the phosphor powder mixed with a diffuser such as barium sulfate and sealed with a silicon-based binder. In general, the fluorescent light is isotopically generated in all directions, while the blue light component incident on the phosphor and reflected without being converted is reflected while part of directivity in the incidence is maintained. This embodiment mixes the phosphor 5 with the diffuser, so that the unconverted blue light also has almost the same isotropic orientation distribution as that of the fluorescent light. Thereby, the blue light incident on the phosphor 5 and reflected without being converted is reflected with an angular range wider than that in the incidence, similarly to the fluorescent light. The unconverted blue light reflected on the phosphor 5 is condensed and collimated by the condenser lens 4, and enters the spectroscopic optical element 3. The light enters the phosphor 5 via the first area 3a of the spectroscopic optical element 3 and passes through the reflection path from the phosphor 5. On the other hand, since the light is reflected with a wider angle component than that of the incidence, the light enters both the first area 3a and the second area 3b of the spectroscopic optical element 3.

As described above, the first area 3a has a characteristic of reflecting the blue light. Hence, the blue light incident on the first area 3a is reflected and returned to the first light source 1. On the other hand, the second area 3b has a spectral characteristic of transmitting the blue light band. Hence, among the unconverted blue light component entering the spectroscopic optical element 3, an almost total amount of the component incident on the second area 3b transmits it and can be maintained with the fluorescent light of the green light component for the subsequent illumination optical system. The size of the first area 3a may be set to an area ratio of about 10 to 20% of the entire optical effective area of the spectroscopic optical element 3 and a necessary minimum size. Thereby, the following illumination optical system can obtain a sufficient amount of blue light.

Next follows a description of the optical path of the red light component generated from the second light source 7. In this embodiment, the second light source (red light source) 7 is an LED (light emitting diode light source) having a square light emitting surface shape. The red light having a wavelength of about 600 to 700 nm generated from the second light source (red LED light source) 7 is emitted from the light emitting surface as a divergent light beam with a relatively wide angle range, but is condensed and collimated by the condenser lens 6. The red light that has been collimated travels to the spectroscopic optical element 3.

As described above, the spectroscopic optical element 3 has a characteristic of reflecting the red light component having a wavelength of 600 to 700 nm. Hence, the red light generated from the second light source 7 is combined by the spectroscopic optical element 3 with the same optical path as that of each of the fluorescent light and the unconverted blue light, and then enters the illumination optical system.

FIG. 5 is a spectral distribution diagram of the white light finally emitted from the light source apparatus 100 according to this embodiment. In FIG. 5, the abscissa axis represents a wavelength (nm) and the ordinate axis represents arbitrary units (a.u.).

As described above, the red light component having a wavelength higher than 590 nm in the fluorescent light is reflected to the first light source 1 side of the spectroscopic optical element 3 and cannot be obtained. On the other hand, since the phosphor 5 uses a phosphor configured to emit the intense green light component as the emission spectrum of the fluorescent light, an amount of the original red component of the fluorescent light is small. A red light source that can provide a sufficient output is selected as the second light source 7. Thus, this embodiment can provide the light source apparatus 100 that compromises both the brightness and white balance. In addition, the spectroscopic optical element 3 is divided into the first area 3a and the second area 3b, and the spectral characteristics of the first area 3a and the second area 3b are made different from each other. Thereby, a sufficient amount of blue light can be obtained with a simple configuration without increasing the number of components. Hence, the compact light source apparatus 100 can be provided which has an excellent white balance and light utilization efficiency.

In particular, the spectroscopic optical element 3 does not need a polarization separation characteristic based on the polarization dependency, and this embodiment relaxes the manufacturing difficulty of the film formation of the spectroscopic optical element 3 by dispersing the wavelength separation function required for both sides of the spectroscopic optical element 3. Thereby, the purpose of this embodiment can be achieved with a simpler configuration. FIG. 1 shows only the fly-eye lens 8 as the illumination optical system, and omits a condenser lens, an image display element (light modulation element), a projection optical system, and the like in the subsequent stage. The light source apparatus 100 according to this embodiment, an unillustrated image display element, etc. can realize a compact image projection apparatus (projector) that is excellent in white balance and light utilization efficiency.

Second Embodiment

Figure 6:
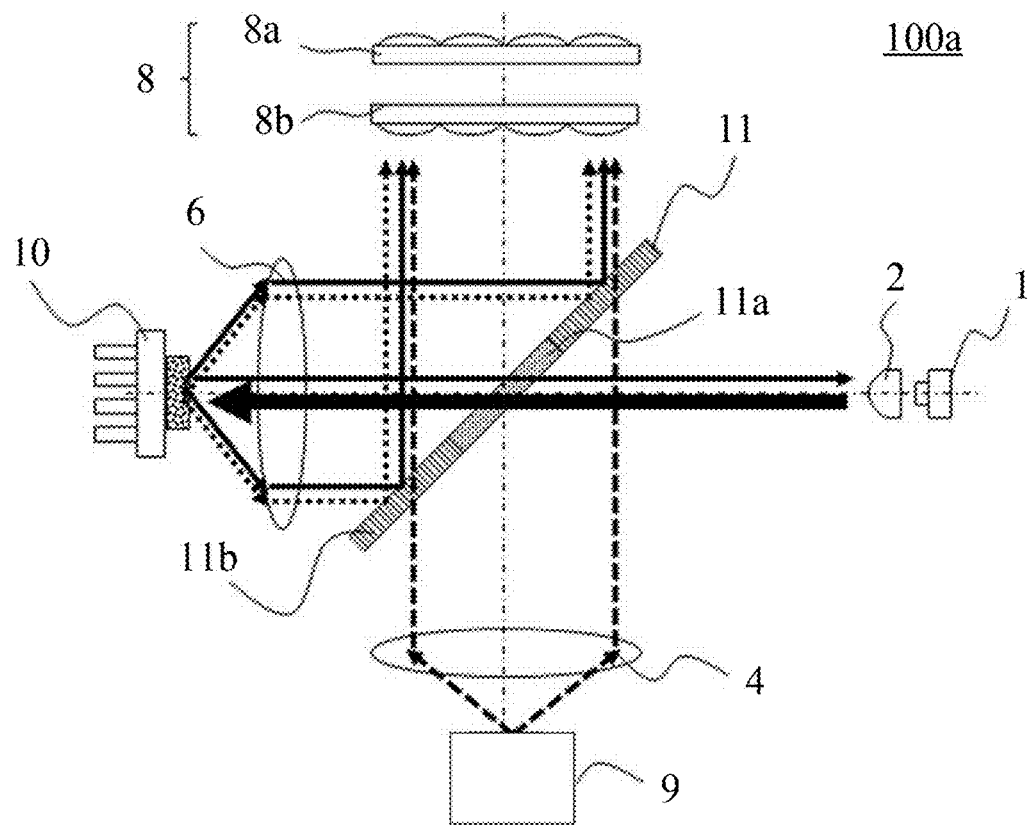
FIG. 6 is a configuration diagram of a light source apparatus according to a second embodiment.

Referring now to FIG. 6, a description will be Liven of a light source apparatus according to a second embodiment of the present invention. FIG. 6 is a configuration diagram of a light source apparatus 100a. The light source apparatus 100a includes a first light source (excitation light source) 1, a collimator lens 2, a spectroscopic optical element (optical path combining element) 11, a condenser lens 4, a phosphor 10, a condenser lens 6, and a second light source (red light source) 9, and a fly-eye lens 8. The fly-eye lens 8 has a first fly-eye lens 8a and a second fly-eye lens 8b. Hereinafter, each component will be described in detail in order from the first light source 1.

This embodiment is different from the first embodiment in that the phosphor 10 opposes to the first light source 1 with respect to the spectroscopic optical element 11, and the second light source (red light source) 9 opposes to the fly-eye lens 8. The configuration of the spectroscopic optical element 11 is also different from that of the spectroscopic optical element 3. Since other configurations in this embodiment are the same as those of the first embodiment, a description thereof will be omitted.

The blue light emitted from the first light source 1 is collimated by the collimator lens 2 disposed just behind it, and travels toward the spectroscopic optical element 11. As described above, the first light source 1 and the phosphor 10 are located opposite to each other with respect to the spectroscopic optical element 11.

Figures 7A, 7B:
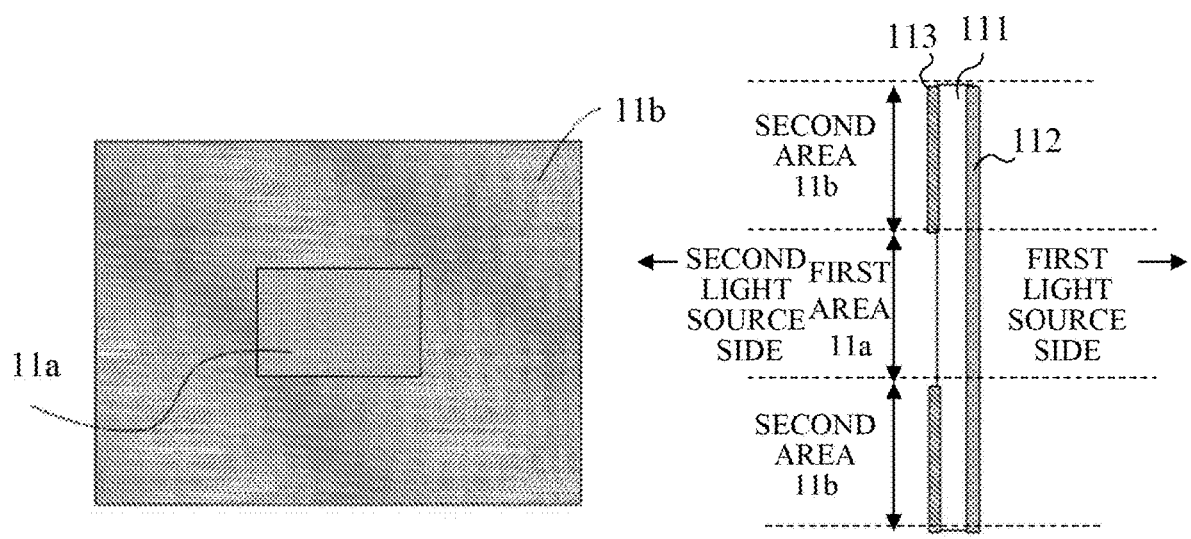
FIGS. 7A and 7B are configuration diagrams of the spectroscopic optical element according to the second embodiment.

Referring now to FIGS. 7A and 7B, a description will be given of a configuration of the spectroscopic optical element 11. FIGS. 7A and 7B are configuration diagrams of the spectroscopic optical element 11, FIG. 7A is its front view, and FIG. 7B is its side view. As illustrated in FIG. 7B, the spectroscopic optical element 11 includes a light-transmissive flat plate 111, a third color separation film 112 formed on the surface on the first light source side of the light-transmissive flat plate 111, and a fourth color separation film 113 formed on the surface on a phosphor side surface of the light-transmissive flat plate 111. The third color separation film 112 and the fourth color separation film 113 are dielectric multilayer films having different spectral characteristics (transmittance characteristics, reflectance characteristics).

As illustrated in FIGS. 7A and 7B, the spectroscopic optical element 11 has a first area (first partial area) 11a and a second area (second partial area) 11b. When viewed from the front, the first area 11a corresponds to an area where only the third color separation film 112 is formed or an area where the fourth color separation film 113 is not formed. When viewed from the front, the second area 11b corresponds to an area where both the third color separation film 112 and the fourth color separation film 113 are formed or the third color separation film 112 and the fourth color separation film 113 overlap each other. As illustrated in FIG. 7A, the first area 11a is provided in the central portion of the spectroscopic optical element 11, and the second area 11b surrounds the first area 11a in the outer circumference portion of the spectroscopic optical element 11.

The first area 11a and the second area 11b have different spectral characteristics (transmittance characteristics, reflectance characteristics) when light enters. The first area 11a is formed only in part of a narrow range with an area ratio of about 10 to 20% of the entire spectroscopic optical element 11. Since the light emitted from the first light source 1 has a high directivity and a small luminous flux diameter, the light enters only the first area 11a of the spectroscopic optical element 11.

As described above, ranges and spectral characteristics of the dielectric multilayer films deposited on the surface on the side where the first light source 1 is disposed and the surface on the side where the phosphor 10 is disposed opposite to the surface. The third color separation film (dielectric multilayer film) 112 provided on the surface on the first light source 1 side is formed over the entire optical effective range, when the spectroscopic optical element 11 is viewed from the front (in the front view of FIG. 7A). On the other hand, the fourth color separation film (dielectric multilayer film) 113 formed on the side where the phosphor 10 is disposed is formed only in the area corresponding to the second area 11b. An antireflection film is formed in another area (or the first area 11a) on the surface on the first light source 1 side.

Figure 8A:
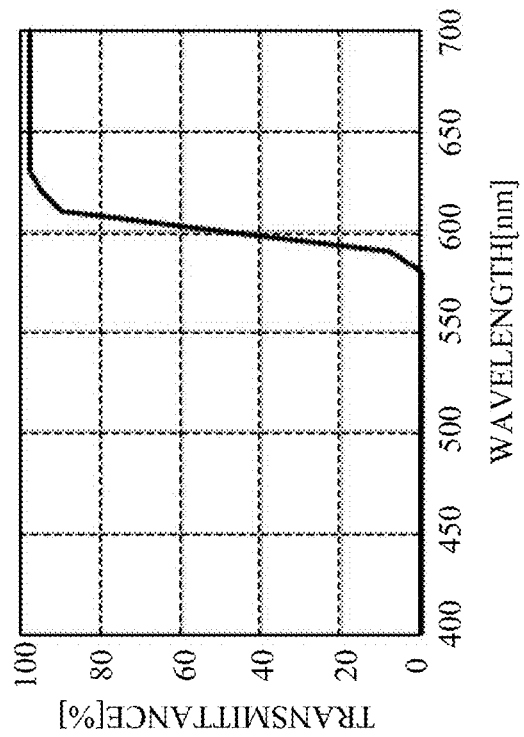
FIGS. 8A and 8B are spectral characteristic diagrams of the spectroscopic optical element according to the second embodiment.
Figure 8B:
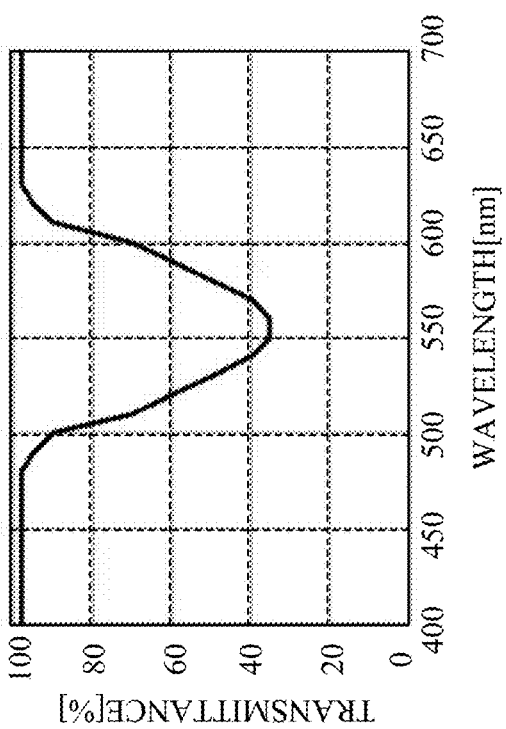

Referring now to FIGS. 8A and 8B, a description will be given of the spectral characteristic (spectral transmittance) of the dielectric multilayer film (the third color separation film 112 and the fourth color separation film 113). FIGS. 8A and 8B show the spectral transmittance of the dielectric multilayer film, FIG. 8A shows the spectral transmittance of the third color separation film 112, and FIG. 8B shows the spectral transmittance of the fourth color separation film 113. In FIGS. 8A and 8B, the abscissa axis represents a wavelength of light (nm), and the ordinate axis represents a transmittance (?/).

As illustrated in FIG. 8A, the third color separation film 112 has a characteristic of transmitting light in a blue band having a wavelength of 440 to 480 nm and light in a red band having a wavelength of 600 to 700 nm. Hence, the blue light incident on the spectroscopic optical element 11 from the first light source 1 is transmitted and travels toward the phosphor 5. On the other hand, the manufacturing difficulty of a dielectric multilayer is relaxed by narrowing the wavelength band that limits the spectral characteristic and without limiting the characteristic of the third color separation film 112 for the green band of another wavelength of 490 to 590 nm.

As illustrated in FIG. 8B, the fourth color separation film 113 has a characteristic of reflecting the light in the blue band with a wavelength of 440 to 480 nm and the light in the green band with a wavelength of 490 to 590 nm. The fourth color separation film 113 has a characteristic of transmitting the light in the red band with a wavelength of 600 to 700 nm. Thus, when the green light enters the first area 11a, it exhibits a characteristic of reflecting the entire green band light since the third color separation film 112 illustrated in FIG. 8A and the fourth color separation film 113 illustrated in FIG. 8B have multiplication characteristics.

In other words, this embodiment forms dielectric multilayer films (third color separation film 112 and fourth color separation film 113) having different areas and characteristics on one surface and the other surface of the spectroscopic optical element 11, respectively. Thereby, the first area 11a has a spectral characteristic of transmitting the first light (blue light), of reflecting the second light (green light), and of transmitting the third light (red light). On the other hand, the second area 11b has a spectral characteristic of reflecting the first light (blue light) and the second light (green light), and of transmitting the third light (red light).

The light that has entered and been reflected on the first area 11a of the spectroscopic optical element 11 toward the phosphor 10 is condensed on the phosphor 10 via the condenser lens 6. The light entering the phosphor 10 is absorbed, converted into fluorescent light having a broad spectral distribution in the range of 480 to 650 nm, and reflected. The spectral distribution at this time is similar to that in the first embodiment, and thus will be described with reference to FIG. 4.

The fluorescent light component reflected by the phosphor 10 is condensed and collimated by the condenser lens 6, and travels toward the spectroscopic optical element 11 again. At this time, since the fluorescent light is generated isotopically in all directions, the light beam diameter when the light is collimated by the condenser lens 6 is larger than that of the blue light when the blue light enters the phosphor 10.

Similar to the first embodiment, the phosphor 10 is mixed with a diffuser such as barium sulfate, and thereby the unconverted blue light has the same isotropic orientation distribution as that of the fluorescent light. Hence, when the blue light enters the spectroscopic optical element 11 from the first light source 1, the light enters only the first area 11a but the fluorescent light generated from the phosphor 10 and the unconverted blue light enter both the first area 11a and the second area 11b.

FIGS. 8A and 8B show that both the first area 11a and the second area 11b have spectral characteristics that transmit the green light component having a wavelength of 490 to 590 nm. Thus, among the fluorescent light generated from the phosphor 10, the green light having a wavelength of 490 to 590 nm transmits the spectroscopic optical element 11 and enters the following illumination optical system. On the other hand, the light having a wavelength higher than 590 nm in the fluorescent light is reflected on the spectroscopic optical element 11 toward the first light source 1, and cannot be obtained.

The first area 11a has a characteristic of reflecting the blue light. Thus, the blue light entering the first area 11a transmits and returns to the first light source 1 again. On the other hand, the second area 11b has a spectral characteristic of reflecting the blue light band. Thus, among the unconverted blue light component entering the spectroscopic optical element 11, an almost total amount of the component incident on the second area 11b is reflected, and can be maintained with the fluorescent light of the green light component for the subsequent illumination optical system. The size of the first area 11a may be set to an area ratio of about 10 to 20% of the entire optical effective area of the spectroscopic optical element 11 and a necessary minimum size. Thereby, the following illumination optical system can obtain a sufficient amount of blue light.

Next follows a description of the optical path of the red light component generated from the second light source 9. In this embodiment, the second light source (red light source) 9 is an LED (light emitting diode light source) having a square light emitting surface shape. The red light having a wavelength of about 600 to 700 nm generated from the second light source (red LED light source) 9 is emitted from the light emitting surface as a divergent light beam in a relatively wide angle range, but is condensed and collimated by the condenser lens 4. The red light that has been collimated travels to the spectroscopic optical element 11.

As described above, the spectroscopic optical element 11 has a characteristic of transmitting red light having a wavelength of 600 to 700 nm. Hence, the red light generated from the second light source 9 is combined by the spectroscopic optical element 11 with the same optical path of each of the fluorescent light and the unconverted blue light, and then enters the illumination optical system.

Similar to the first embodiment, the red light component having a wavelength higher than 590 nm in the fluorescent light transmits the spectroscopic optical element 11 to the first light source 1 side and cannot be obtained. On the other hand, since the phosphor 10 uses a phosphor configured to emit an intense green light component as the emission spectrum of fluorescent light, an amount of the red component is small in the fluorescent light. A red light source that can provide a sufficient output is selected as the second light source 9. Thus, this embodiment can provide the light source apparatus 100a that compromises both the brightness and white balance. The spectroscopic optical element 11 is divided into the first area 11a and the second area 11b, and the spectral characteristics of the first area 11a and the second area 11b are made different from each other. Thereby, a sufficient amount of blue light can be obtained with a simple configuration without increasing the number of components. Hence, the compact light source apparatus 100a having the excellent white balance and light utilization efficiency can be realized.

Unlike the first embodiment, this embodiment disposes the phosphor 10 opposite to the first light source 1. With this configuration, the first light source 1 and the second light source 9 can be closer to each other. Hence, the cooling system that directly emits light for the light source can be made common, and the entire light source apparatus can be made compact. Even in this configuration, the present invention is applicable based on an arrangement of the light sources by changing the configuration of the spectroscopic optical element 11 as necessary. This embodiment can realize a white light source that can simultaneously provide blue light with a simple configuration without increasing the number of components by adding a dedicated light source that generates light in a wavelength band insufficient for the phosphor, such as red, to improve the color reproducibility.

Third Embodiment

Figure 9:
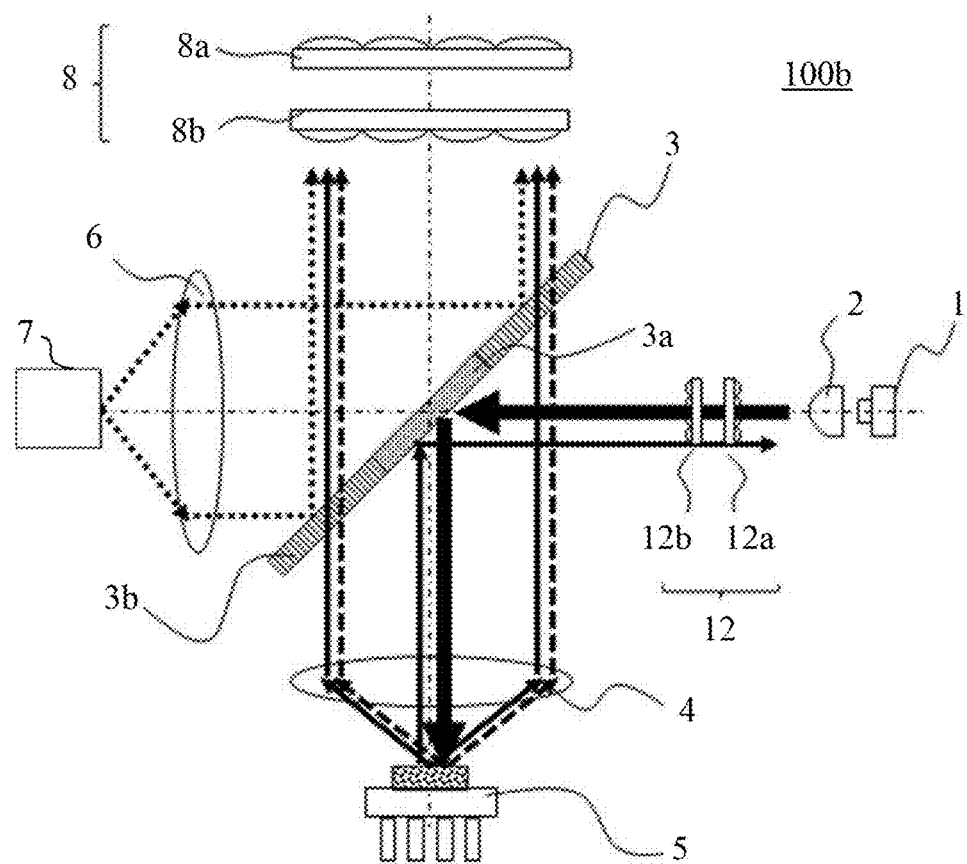
FIG. 9 is a configuration diagram of a light source apparatus according to a third embodiment.

Referring now to FIG. 9, a description will be Liven of a light source apparatus according to a third embodiment of the present invention. FIG. 9 is a configuration diagram of a light source apparatus 100b. The light source apparatus 100b is different from the light source apparatus 100 in the first embodiment in that it includes a pair of lens arrays 12 (lens arrays 12a and 12b) between the first light source 1 and the spectroscopic optical element 3. Since other configurations of this embodiment are the same as those of the first embodiment, a description thereof will be omitted.

The blue light emitted from the first light source 1 is collimated by the collimator lens 2 disposed just after it, and enters the lens array (first lens array) 12a. The parallel light beam enters the lens array 12a, becomes divided light beams, and then enters the lens array (second lens array) 12b. The divided light beams emitted from the lens array 12b enter the first area 3a in the spectroscopic optical element 3, are reflected, and travel toward the condenser lens 4. The condenser lens 4 condenses and superimposes the divided light beams to form a uniform laser light source spot having a shape similar to the lens cell of the lens array 12a on the phosphor 5. Hereinafter, the principle will be described with reference to FIG. 10.

Figure 10:
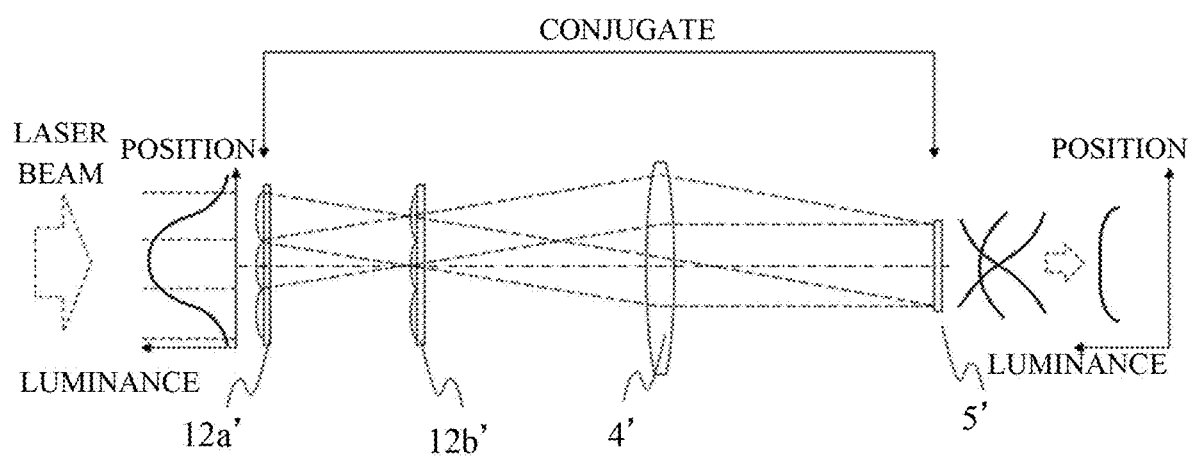
FIG. 10 is an explanatory diagram of a spot formation on the phosphor by a lens array according to the third embodiment.

FIG. 10 is an explanatory diagram of the spot formation on the phosphor by the lens array, and shows a simplified optical relationship between the lens arrays 12a and 12b, the condenser lens 4, and the phosphor 5 of the light source apparatus 100b. In FIG. 10, reference numeral 12a' corresponds to the lens array 12a, and reference numeral 12b' corresponds to the lens array 12b, reference numeral 4' corresponds to the condenser lens 4, and reference numeral 5' corresponds to the phosphor 5.

The phosphor 5' is substantially conjugate with each lens cell of the lens array 12a' with respect to the lens array 12b' and the condenser lens 4'. In other words, the first lens array surface and the phosphor surface have an imaging relationship. Thus, an image corresponding to the light distribution formed on each lens cell of the lens array 12a' is formed on the phosphor 5'. The size of the image is determined by the pitch of the lens cells and the magnification of the imaging system. The light distribution images formed on lens cells overlap each other on the phosphor 5' via the condenser lens 4'. Here, even when the light beam incident on the lens array 12' has an uneven luminance distribution, the light distribution formed on each lens cell is averaged by the number of lens cells for the above reason and thus a uniform distribution can be formed.

The lens cell of the lens array 12a according to this embodiment has a square shape, and the spot of the laser light source formed on the phosphor 5 also has a substantially square shape for this reason. Thus, the light emission spot composed of the fluorescent light and the unconverted light on the phosphor 5 has also a square shape, and is substantially similar to the square that is the light emitting surface shape of the LED light source that serves as the second light source (red light source) 7.

When the light emitting spots of the light sources that generates different light (colored light) have different shapes, the light utilization efficiency in the following illumination optical system is different for each color and thus the color balance and color unevenness deteriorate. On the other hand, this embodiment inserts the lens array 12 into a space between the first light source 1 and the spectroscopic optical element 3. Thereby, the shape of the light emitting spot composed of the fluorescent light and the unconverted blue light on the phosphor 5 can be made similar to the shape of the light emitting surface of the second light source (red light source) 7 disposed on another optical path and the color balance and color unevenness can be optimized.

Thus, in this embodiment, the lens cell of the lens array (first lens array) 12a has a shape similar or substantially similar to the light emitting surface of the second light source 7. The lens array 12a is conjugate with the phosphor 5. Where X1 is a width of the lens cell of the lens array 12a in the first direction (X direction), Y1 is a width of the lens cell of the lens array 12a in a second direction (Y direction), X2 is a width of the light emitting surface of the second light source 7 in the first direction, and Y2 is a width of the light emitting surface of the second light source 7 in the second direction, the following conditional expression (1) may be satisfied.

$$0.8 \leq (Y1/X1) \times (X2/Y2) \leq 1.2 \quad (1)$$

Fourth Embodiment

Figure 11:
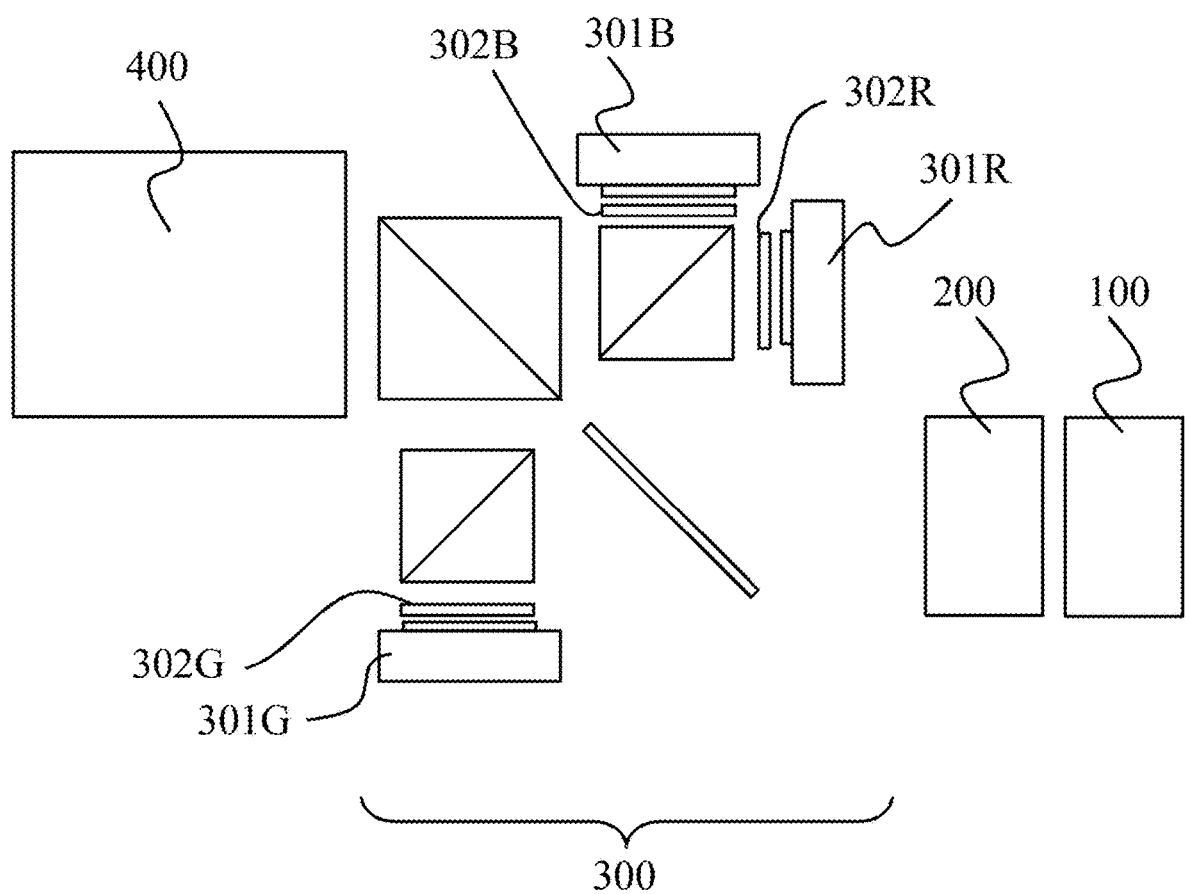
FIG. 11 is a configuration diagram of a projector according to a fourth embodiment.

Referring now to FIG. 11, a description will be given of a fourth embodiment according to the present invention.

FIG. 11 is a configuration diagram of a projector (image projection apparatus) 1000 according to this embodiment. A reflection type liquid crystal panel is used for the light modulation element for the projector 1000. In FIG. 11, reference numeral 100 denotes a light source apparatus (which may be the light source apparatus 100a or the light source apparatus 100b instead of the light source apparatus 100), reference numeral 200 denotes an illumination optical system, reference numeral 300 denotes a color separation and combination optical system, and reference numeral 400 denotes a projection optical system. The light source apparatus 100 emits light toward the illumination optical system 200. The illumination optical system 200 illuminates light from the light source apparatus 100. The color separation and combination optical system 300 performs a color separation and a color combination for the illumination light from the illumination optical system 200. The projection optical system 400 projects the combined light from the color separation and combination optical system 300.

In the color separation and combination optical system 300, reference numerals 301R, 301G, and 301B denote reflection type liquid crystal panel units having red, green, and blue light modulation elements (red, green, and blue reflection type liquid crystal panels). Reference numerals 302R, 302G, and 302B denote waveplate units having red, green, and blue waveplates. In this embodiment, the light modulation elements included in the reflective liquid crystal panel units 301R, 301G, and 301B are reflection type liquid crystal panels, but the present invention is not limited to this embodiment. For example, a transmission type liquid crystal panel may be used for the light modulation element. Regardless of the number of reflection type liquid crystal panels, the present invention is applicable to any projector such as a single-element type or a three-element type.

Each embodiment can provide a white light source that can simultaneously obtain the blue light with a simple configuration without increasing the number of components, by adding a dedicated light source that generates light in a wavelength band insufficient for the phosphor, such as red, to improve the color reproducibility. Thus, each embodiment can provide a light source apparatus and an image projection apparatus, each of which has an excellent color reproducibility with a compacter and simpler configuration than those of the prior art.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a laser diode light source may be used for the second light source (red light source) instead of the LED light source. The laser diode light source can relatively easily increase an output rather than the LED light source, and can make larger the light source output by increasing the output of the excitation light source and a light emission amount of the phosphor and by maintaining the color balance of the white light. Instead of the red light source having a red wavelength (red light) of 600 nm to 670 nm as a dominant wavelength, a light source (infrared light) having an infrared wavelength (infrared light) of 680 nm or higher as a dominant wavelength may be used for the second light source. At this time, blue light is reflected in the first area of the spectroscopic optical element, and the second area transmits the entire visible light. Originally, the phosphor emits a smaller amount of an infrared light component than red light due to the light emission mechanism. Thus, the infrared light component in the white light can be enhanced by combining the infrared light from the infrared light source with the spectroscopic optical element of the present invention.

This application claims the benefit of Japanese Patent Application No. 2018-181305, filed on Sep. 27, 2018, which is hereby incorporated by reference herein in its entirety.

What is claimed is:

1. A light source apparatus comprising:
a first light source configured to generate first light;
a phosphor to be excited by the first light to generate second light;
a second light source configured to generate third light; and
a spectroscopic optical element configured to reflect the first light to the phosphor and to combine the first light reflected without being absorbed by the phosphor, the second light, and the third light with one another,
wherein the spectroscopic optical element has a first area and a second area,
wherein the first area has a spectral characteristic of reflecting the first light, of transmitting the second light, and of reflecting the third light, and
wherein the second area has a spectral characteristic of transmitting the first light and the second light, and of reflecting the third light.

2. The light source apparatus according to claim 1, wherein the first light source and the second light source are located opposite to each other with respect to the spectroscopic optical element, and
wherein the spectroscopic optical element includes:
a light-transmissive flat plate,
a first color separation film formed on a surface on a first light source side of the light-transmissive flat plate in the first area; and
a second color separation film formed on a surface of a second light source side of the light-transmissive flat plate in both the first area and the second area;
wherein the first color separation film and the second color separation film have spectral characteristics different from each other.

3. The light source apparatus according to claim 2, wherein the first color separation film has the spectral characteristic of reflecting the first light and of transmitting the second light, and
wherein the second color separation film has a spectral characteristic of transmitting the first light and the second light, and of reflecting the third light.

4. A light source apparatus comprising:
a first light source configured to generate first light;
a phosphor to be excited by the first light to generate second light;
a second light source configured to generate third light; and
a spectroscopic optical element configured to transmit the first light to the phosphor and to combine the first light reflected without being absorbed by the phosphor, the second light, and the third light with one another,
wherein the spectroscopic optical element has a first area and a second area,
wherein the first area has a spectral characteristic of transmitting the first light, of reflecting the second light, and of transmitting the third light, and
wherein the second area has a spectral characteristic of reflecting the first light, of reflecting the second light, and of transmitting the third light.

5. The light source apparatus according to claim 4, wherein the first light source and the phosphor are located opposite to each other with respect to the spectroscopic optical element, and
wherein the spectroscopic optical element includes:
a light-transmissive flat plate,
a third color separation film formed on a surface on a first light source side of the light-transmissive flat plate in both the first area and the second area; and
a fourth color separation film formed on a surface on a phosphor side surface of the light-transmissive flat plate in the second area, and
wherein the third color separation film and the fourth color separation film have spectral characteristics different from each other.

6. The light source apparatus according to claim 5, wherein the third color separation film has a spectral characteristic of transmitting the first light and the third light, and
wherein the fourth color separation film has a spectral characteristic of reflecting the first light and the second light, and of transmitting the third light.

7. The light source apparatus according to claim 1, wherein the second area surrounds the first area.

8. The light source apparatus according to claim 1, further comprising a first lens array and a second lens array between the first light source and the spectroscopic optical element,
wherein a lens cell of the first lens array has a similar shape to a light emitting surface of the second light source.

9. The light source apparatus according to claim 8, wherein the first lens array is conjugate with the phosphor.

10. The light source apparatus according to claim 8, wherein the following conditional expression is satisfied:

$$0.8 \leq (Y1/X1) \times (X2/Y2) \leq 1.2$$

where X1 is a width of the lens cell of the first lens array in a first direction, Y1 is a width of a second direction, X2 is a width of the light emitting surface of the second light source in the first direction, and Y2 is a width in the second direction.

11. The light source apparatus according to claim 1, wherein the second light source is a light emitting diode light source.

12. The light source apparatus according to claim 1 wherein the second light source is a laser light source.

13. The light source apparatus according to claim 1, wherein a dominant wavelength of the third light is a red wavelength of 600 nm or higher and 670 nm or lower.

14. The light source apparatus according to claim 1, wherein a dominant wavelength of the third light is an infrared wavelength of 680 nm or higher.

15. An image projection apparatus comprising:
the light source apparatus according to claim 1;
a light modulator; and
an illuminating optical system configured to illuminate the light modulation element with a light beam emitted from the light source apparatus.

16. An image projection apparatus comprising:
the light source apparatus according to claim 4;
a light modulator; and
an illuminating optical system configured to illuminate the light modulation element with a light beam emitted from the light source apparatus.

* * * * *